Sept. 13, 1932. L. L. BECK 1,877,713

MOTION STUDY

Filed Dec. 26, 1929

Inventor
LEO L. BECK

By his Attorneys
Bohleber & Ledbetter

Patented Sept. 13, 1932

1,877,713

UNITED STATES PATENT OFFICE

LEO L. BECK, OF WESTFIELD, NEW JERSEY, ASSIGNOR TO CLAUDE NEON LIGHTS, INC., OF NEW YORK, N. Y., A CORPORATION OF NEW YORK

MOTION STUDY

Application filed December 26, 1929. Serial No. 416,560.

The present invention relates to an improved method for the observation or measurement of rapid movement and to improved apparatus whereby movement, particularly high speed movement, may be observed or measured.

The invention provides an improved means for studying high speed motion and determining possible distortions therein. It is difficult or impossible to determine, by means of the usual measuring instruments, whether an object moving at high speed, as for example an aeroplane propeller, is deviating from its proper course of motion, since these instruments cannot be brought near, or applied to the moving part without danger to the instrument or to the operator or both.

The present invention provides a new and improved means of accomplishing the study and measurement of such motion and distortions. The present invention moreover, provides an improved method whereby the object can be photographed under conditions in which although moving at high speed, the object appears to be at rest or in slow motion, and the photographs so obtained may be superimposed on corresponding photographs of the object taken when in a state of true rest or true slow motion. By this means, discrepancies or lack of coincidence of the respective impressions are evidenced clearly and represent distortion which may be acurately measured. In other words, the invention provides a method and aparatus according to which photographs of the object in an apparent condition of slow motion or rest may be recorded and compared with corresponding photographs of the same object in a condition of true rest or true slow motion, and distortions due to the said motion may thus be subjected to careful measurement.

The invention furthermore provides an improved aparatus for recording photographically, as on a moving picture film, a rapidly moving object illuminated by a source of light which is produced intermittently in successive impulses, the rate of which can be accurately controlled so as to be equal to or bear a definite relationship to the rate of movement of the moving object so that the latter may be photographed by a moving picture film negative, which when developed and projected, represents the moving object either in a state of rest or of slow motion, depending upon the relationship between the rate of motion of the moving object and the frequency of the impulses of light employed for illuminating the said moving object.

The invention provides a new and useful combination comprising a source of light of high actinic value adapted to emit light in sharply defined and rapidly recurring impulses with little or substantially no time lag between the said rapidly recurring or successive impulses and a means for recording the motion of an object illuminated by the said light.

The invention furthermore provides a gaseous discharge luminous tube device adapted to emit light having high actinic value and also adapted to emit such light in rapidly recurring sharply defined successive impulses with little or substantially no time lag between the said impulses.

The invention furthermore provides a gaseous discharge luminous light of the character described, in combination with means for supplying the said light with high frequency or rapidly recurring successive discharges of electric current.

Regarding the source of illumination, this may comprise a transparent envelope containing helium and provided with electrodes connected to a source of electrical discharge current such as apparatus adapted to supply successive rapidly recurring discharge impulses as will be more fully hereinafter described. To provide a sufficient volume of light, the envelope may be elongated and to confine the envelope within a relatively small space in compact form, the elongated envelope may comprise a series of portions bent back upon each other to form a grid. Helium has been found well adapted to emit light in sharply defined and rapidly recurring impulses or flashes under the influence of rapidly recurring impulses of discharge current, since during the corresponding rapidly recurring periods in which no discharge takes place, the light is sharply extinguished with substantially no after-glow or lag in the apparatus between the discharge impulses and helium therefore possesses a substantial advantage in this respect over other substances, as for example, mercury vapor. Helium also possesses a combination of the valuable property just mentioned, together with high intensity and high actinic value which therefore render helium well adapted to illuminate the object whose motion is to be studied or measured and to effect photographic film with the light resulting from such illumination. Krypton might be used so far as actinic effect is concerned but it lacks intensity. Neon has considerable intensity but lacks actinic effect and mercury vapor is highly actinic but has an undesirable time lag.

Helium therefore possesses three particularly valuable properties, namely, absence of time lag, high intensity and high actinic effect. It is however desirable, in order to realize these effects to their fullest extent, to have the helium in a substantially pure condition. By utilizing these properties as described herein, an improved means of measuring and studying high speed motion is provided whereby the results of such study may be recorded accurately on photographic film.

Regarding the means for obtaining control of the nature and frequency of the rapidly recurring successive impulses of electrical discharge current applied to the helium lamp, one particularly desirable form provided by the present invention in combination with the helium lamp comprises a super-heterodyne circuit. This comprises a transformer containing two primary windings, each of which is connected to an oscillator, and a secondary coil connected to the electrodes of the helium lamp. The discharge frequency of each oscillator is subject to control by varying the capacity thereof. Frequencies of different values may therefore be superimposed upon the secondary circuit and cause discharges or beats through the helium lamp equal in frequency to the difference between the frequencies of each individual oscillator. By means of a wave meter interposed in the secondary circuit, the oscillators may be calibrated to read in terms of beats or impulses of known and accurately determinable frequencies which may therefore be applied to the helium lamp by an adjustment of the capacity of each oscillator. Instead of the super-heterodyne circuit herein referred to, a high frequency alternator, such as an Alexanderson high frequency alternator or a suitable rotary spark gap may be employed.

The device for recording the motion being studied or measured, may comprise any suitable or standard form of motion picture recording camera.

The object whose distortions while in motion it is desired to study or measure may of course be any one of a large number of objects, as for example, an aeroplane propeller or the poppet valve of an automobile motor.

The invention will be described in greater detail with reference to the accompanying drawing which represents embodiments of the apparatus of the invention and of means for the practice of the process thereof. It is intended and will be understood that the invention is illustrated by and not limited to such specific illustrations.

Figure 1:
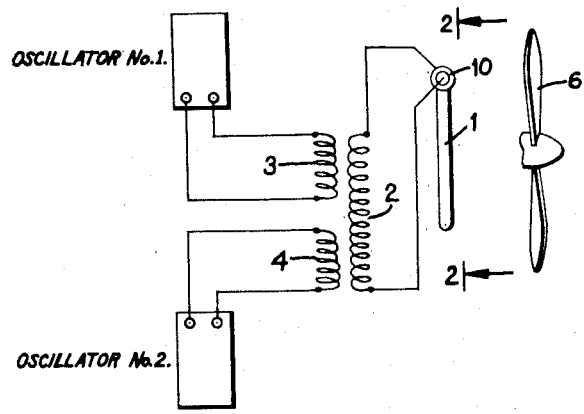
Figure 1 shows in diagrammatic form in combination, a helium lamp, an object to be studied such as an aeroplane propeller and a motion picture recording camera. The helium lamp is provided with means for controlling and varying the frequency of the discharge, this means comprising, a transformer and double oscillator circuits.
Figure 1:
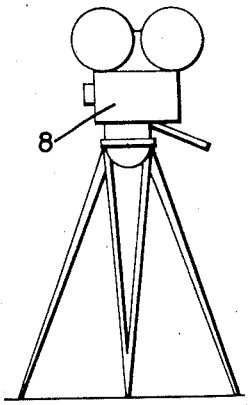

Referring to Figure 1, the lamp 1 forms a part of the secondary circuit of a transformer, the secondary winding 2 of which is interlinked with two primary windings. The primary winding 3 is a part of oscillator No. 1 circuit and the primary winding 4 is part of oscillator No. 2 circuit. Each oscillator is provided with means for controlling and varying the frequency thereof. The object to be studied is represented by the aeroplane propeller 6 and the motion thereof may be recorded by means of the recording camera 8.

Figure 2:
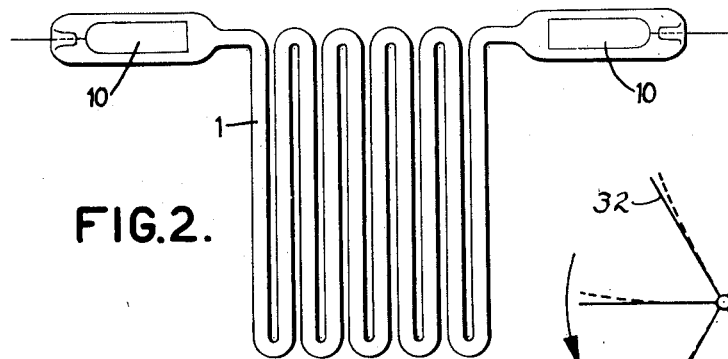
Figure 2 represents in part an elevation on the line 2—2 of Figure 1 showing an enlarged elevational view of the helium lamp shown in Figure 1.

In Figure 2, the elongated envelope 1 is provided at each end thereof with enlarged portions containing electrodes 10. The envelope is compacted in the form of a grid with closely adjacent return bends, as shown. The envelope contains purified helium gas at a pressure of from 5 to 20 millimeters, as for example, 10 millimeters, as measured in the usual way by mercury.

Figure 3:
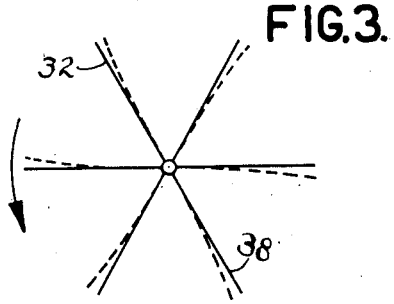
Fig. 3 represents a composite photograph of a propeller when operating under different conditions.

Figure 3 shows the respective positions of an aeroplane propeller, as photographed in a condition of true rest or true slow motion, and when revolving at high speed. The solid lines indicate the photographic impression corresponding to a condition of true rest or true slow motion while the dotted lines represent the impression obtained when the propeller is revolving at high speed in a distorted path, the figure being intended to show how the distortion due to high speed motion may be readily measured.

Figure 4:
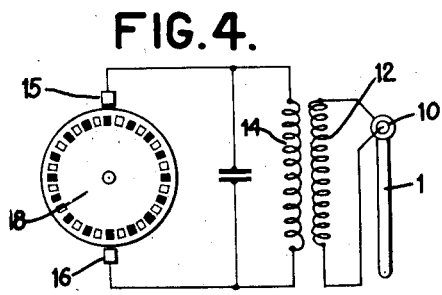
Figure 4 shows a helium lamp in combination with a high frequency alternator and Figure 5 shows a similar lamp in combination with a rotary spark gap.

In Figure 4 the helium lamp 1 forms part of the secondary circuit of the secondary winding 12 of a transformer. The primary winding 14 is connected to the poles 15 and 16 of a high frequency alternator having a rotor 18, the speed of which may be controlled by any suitable means.

Figure 5:
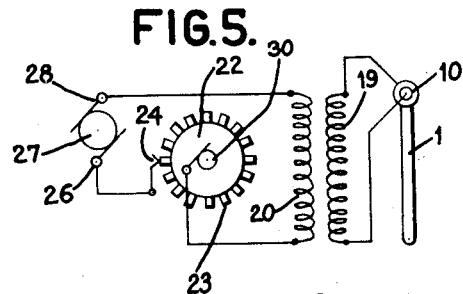

In Figure 5, the helium lamp again forms part of the secondary circuit including the secondary winding 19 of a transformer, the primary winding 20 of which is connected through a rotary spark gap device to a source of current indicated by the generator 27. The rotor 22 of the rotary spark gap has on the circumference a plurality of contact members 23 adapted to form successive contacts with the stationary contact member 24 which is connected to one pole 26 of the generator 27. The other pole 28 thereof is connected through the primary 20 of the transformer to the armature 30 of the rotary spark gap. Referring to Figures 4 and 5, the frequency of electric discharge through the lamp can readily be controlled by controlling the speed of rotation of the rotors respectively.

In operating the helium lamp, whether in combination with the super-heterodyne circuit shown in Figure 1, or the frequency controlling means shown in Figures 4 and 5, the potential at which the discharge take place through the lamp will depend upon several variables including the distance between the electrodes, the diameter of the envelope and the pressure of the helium in the envelope. Helium being a gas particularly prone to exhibit the phenomenon known as "sputtering" which is accompanied by depletion of the gaseous contents of the envelope and disintegration of electrodes, it is desirable to stabilize the electrodes. This may be done by providing the electrodes with coatings of suitable substances, as for example, oxides or suboxides of the alkaline earth metals, or by constructing electrodes so that the surface thereof, as when made of metal such as iron, copper, nickel, carbon and the like, is sufficiently large so that "sputtering" is reduced, or by providing the electrodes or cathode with metals such as caseium, potassium, sodium and lithium.

Referring now more particularly to Figures 1 and 3, let it be assumed, for purposes of illustration, that the aeroplane propeller 6 is subject to distortion of the blades when revolving at high speed and that it is desired to measure such distortion. The propeller, starting from a given position such as that shown in Figure 3 with the blades 32 and 38 in the positions shown, is then moved at a slow and definite speed the latter being so slow that no distortion of the blades occurs and this motion is then photographed by means of the moving picture camera 8. To obtain a series of photographic impressions of the object when in a state of apparent slow motion, the helium lamp is then put in operation and the propeller is rotated at that particular high speed at which the distortion of the propeller blades is to be measured. A series of photographic impressions is then taken by means of the motion picture camera 8 under conditions according to which the propeller is in a condition of apparent slow motion, the apparent rate of rotation being substantially the same as the previously recorded speed of true slow motion. Two films are thereby obtained showing the blades in successive positions when rotating at true and apparent slow rates of rotation respectively, the various positions of the blades being represented by the solid lines in Figure 3 corresponding to true slow motion, and the corresponding successive positions for apparent slow motion being shown by dotted lines. By superimposing one film upon the other, the distortion due to the high speed motion shows up plainly, particularly when the films are viewed in enlarged form such as under a microscope, as indicated by the dotted and full lines in Figure 3, and the extent of the said distortion may be accurately measured. When the frequency of the discharge in the helium lamp is substantially equal to the speed of rotation of the propeller, the latter appears to be at rest and photographs in one position only, whereas a divergence or discrepancy between the rate of rotation and the frequency of discharge causes the propeller to appear to move, the speed of such apparent movement being regulated by the extent of the difference between the rate of discharge and the speed of rotation. The frequency of discharge is regulated by varying the capacity of the oscillator circuits. A wide range of apparent rotative speeds may therefore be photographed by varying the frequency of electric discharge through the lamp with respect to the speed of rotation of the moving part.

For some purposes, a moving picture camera is not required. For example, the blades 32 and 38 may be photographed in the position shown, in a state of rest. The blades can then be rotated at high speed and the frequency of discharge of the helium lamp can be regulated to be substantially equal to the speed of rotation of the blades 32 so that the latter appear to be at rest and a photograph may be taken of the blade in this apparent state of rest by means of an ordinary camera. Comparison of the two negatives will then clearly establish the presence or absence of distortion and permit the extent of the latter to be accurately measured. While the particular illustration specifically described herein refers to an aeroplane propeller, it is of course understood that the invention is useful in connection with a large variety of objects operative at high speeds, as for example, poppet valves of motors and the like.

What is claimed is:—

The method of determining distortion due to high speed motion of a moving object, which comprises photographing the object under conditions in which no distortion occurs, then operating the object at high speed conditions, illuminating the object with the light radiated by helium illuminated by a high frequency electric discharge passing through the helium adjusting the frequency of the discharge with respect to the speed of the moving object and, obtaining thereby an apparent speed condition apparently identical with the said first mentioned condition, photographing the apparent condition, and comparing the photographic record of the said first mentioned and the said apparent speed conditions, respectively, to determine the extent of distortion caused by the high speed.

In testimony whereof I affix my signature.

LEO L. BECK.